(12) United States Patent
Craven

(10) Patent No.: US 6,357,899 B1
(45) Date of Patent: Mar. 19, 2002

(54) TRAILER HITCH ATTACHMENT WITH ILLUMINATED LOGO

(76) Inventor: James R Craven, 3348 Taylor Blvd., Louisville, KY (US) 40215

( * ) Notice: Subject to any disclaimer, the term of this patent is extended or adjusted under 35 U.S.C. 154(b) by 0 days.

(21) Appl. No.: 09/536,113

(22) Filed: Mar. 27, 2000

(51) Int. Cl.[7] ................................................. B60Q 1/44
(52) U.S. Cl. ........................ 362/485; 362/498; 362/499
(58) Field of Search .................................. 362/485, 497, 362/498, 504, 515, 523, 308, 499; 340/474, 468, 465, 422; 280/455.1, 502–511

(56) References Cited

U.S. PATENT DOCUMENTS

| | | | |
|---|---|---|---|
| 4,800,471 A | * | 1/1989 | Lippert ........................ 362/485 |
| 6,053,627 A | * | 4/2000 | Vo et al. ...................... 362/485 |
| 6,140,919 A | * | 10/2000 | Buchanan ................... 340/468 |
| D437,431 S | * | 2/2001 | Crouse et al. ............... D26/28 |

* cited by examiner

Primary Examiner—Sandra O'Shea
Assistant Examiner—Ismael Negron
(74) Attorney, Agent, or Firm—Michael I. Kroll

(57) ABSTRACT

The trailer hitch attachment disclosed is made up of a 12-volt illuminated receiver style trailer hitch cover 10 with a decorative or logo design 26 on the lens face 34. The cover 10 lights when the brake pedal 52 of the vehicle 12 is pushed. The receiver cover is designed to fit into a two-inch standard receiver trailer hitch 14 and plugs into the existing trailer hitch wiring harness 18 from which it receives its power. There is a square tube 28 mounted thereon which tube is inserted into the vehicle trailer hitch receiver socket 14. An automotive light bulb 38 is mounted at the opening between the tube and the face of the socket for illumination. The lens 34 is a two-color, plastic lens which has a variety of decorative designs 26 on its face. The lens face 34 can be decorated with different vinyl decals to create a wide variety of designs for the face of the trailer hitch cover.

6 Claims, 9 Drawing Sheets

TRAILER HITCH ATTACHMENT WITH ILLUMINATED LOGO

CONTINUING APPLICATION INFORMATION

This application is a continuation of Provisional Application Serial No. 60/158,900 filed on Oct. 12, 1999 entitled "Illuminated Logo Hitch Cover."

BACKGROUND OF THE INVENTION

1. Disclosure Document Program

A Disclosure Document Deposit Request was filed by the inventor, James R. Craven, on Jan. 5, 1999 having No. 449518.

2. Field of the Invention

The present invention relates generally to trailer hitch covers, and, more particularly, is concerned with an illuminated receiver-style trailer hitch cover with a decorative logo design on the lens face.

Description of the Prior Art

Other trailer hitch covers have been described in the prior art. U.S. Pat. No. 5,603,178 issued to Morrison on Feb. 18, 1997. Another U.S. Pat. No. 5,593.170 issued to Chiu on Jan. 14. 1997.

The ornamental cover is installed on a rectangular, tubular trailer hitch socket for substantially covering or concealing the otherwise undecorated opening of the hitch socket. The cover is configured to be quickly and easily installed over and partly within the opening of any standard frame-mounted hitch socket, thereby improving the aesthetic appeal of the rear of a vehicle so equipped. In the preferred embodiment, the cover includes a plate that includes an outer surface bearing user-selected ornamentation and an insert extending from the center of the inner surface of the plate. The insert is dimensioned for insertion into a standard rectangular hitch socket. An ear extends from the insert and away from the plate for securing the cover partly within the socket. The ear is offset from the center of the insert so that when the cover is installed the ear extends substantially parallel to and adjacent an interior wall of the socket. The ear has a circular bore formed therein, into which an internally threaded nutsert is press fitted. The ornamental cover is firmly secured to the hitch socket by a round, Allen-headed fastener that extends through a hold in a wall of the hitch socket and threadedly engages the nutsert.

A cover for protecting a trailer hitch ball or box beam comprises a resilient body having a wiring connector integrally formed therewith. Moisture, dirt and physical damage of the trailer hitch ball is minimized through use of the protective cover.

While these trailer hitch covers may be suitable for the purposes for which they were designed, they would not be as suitable for the purposes of the present invention, as hereinafter described.

SUMMARY OF THE PRESENT INVENTION

The present invention discloses a 12-volt illuminated receiver style trailer hitch cover with a decorative or logo design on the lens face. The present invention lights when the brake pedal of the vehicle is pushed. The receiver cover of the present invention is designed to fit into a two-inch standard receiver trailer hitch and plugs into the existing trailer hitch wiring harness from which it receives its power. The present invention has a square tube mounted thereon which tube is inserted into the vehicle trailer hitch receiver. An automotive light bulb is mounted at the opening between the tube and the face of the socket for illumination. The lens of the present invention is a two-color. plastic lens which has a variety of decorative designs on its face. The lens face can be decorated with different vinyl decals to create a wide variety of designs for the face of the trailer hitch.

An object of the present invention is to provide an ornamental design to be attached to the trailer hitch of a vehicle. A further object of the present invention is to provide a decorative design which can reflect the user's support for a favorite sports team or other organization. A further object of the present invention is to protect the trailer hitch receiver tube from outside debris and water in order to prevent rust. A final object of the present invention is to provide a receiver for the trailer hitch light plug electrical wiring harness in order to prevent it from hanging loose when it is not being used and thereby being damaged by weather or road related hazards.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is. therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DESCRIPTION OF THE PREFERRED EMBODIMENT(S)

In order that the invention may be more fully understood, it will now be described, by way of example, with reference to the accompanying drawings in which FIGS. 1 through 9 illustrate the present invention being an illuminated logo hitch cover.

Figure 1:
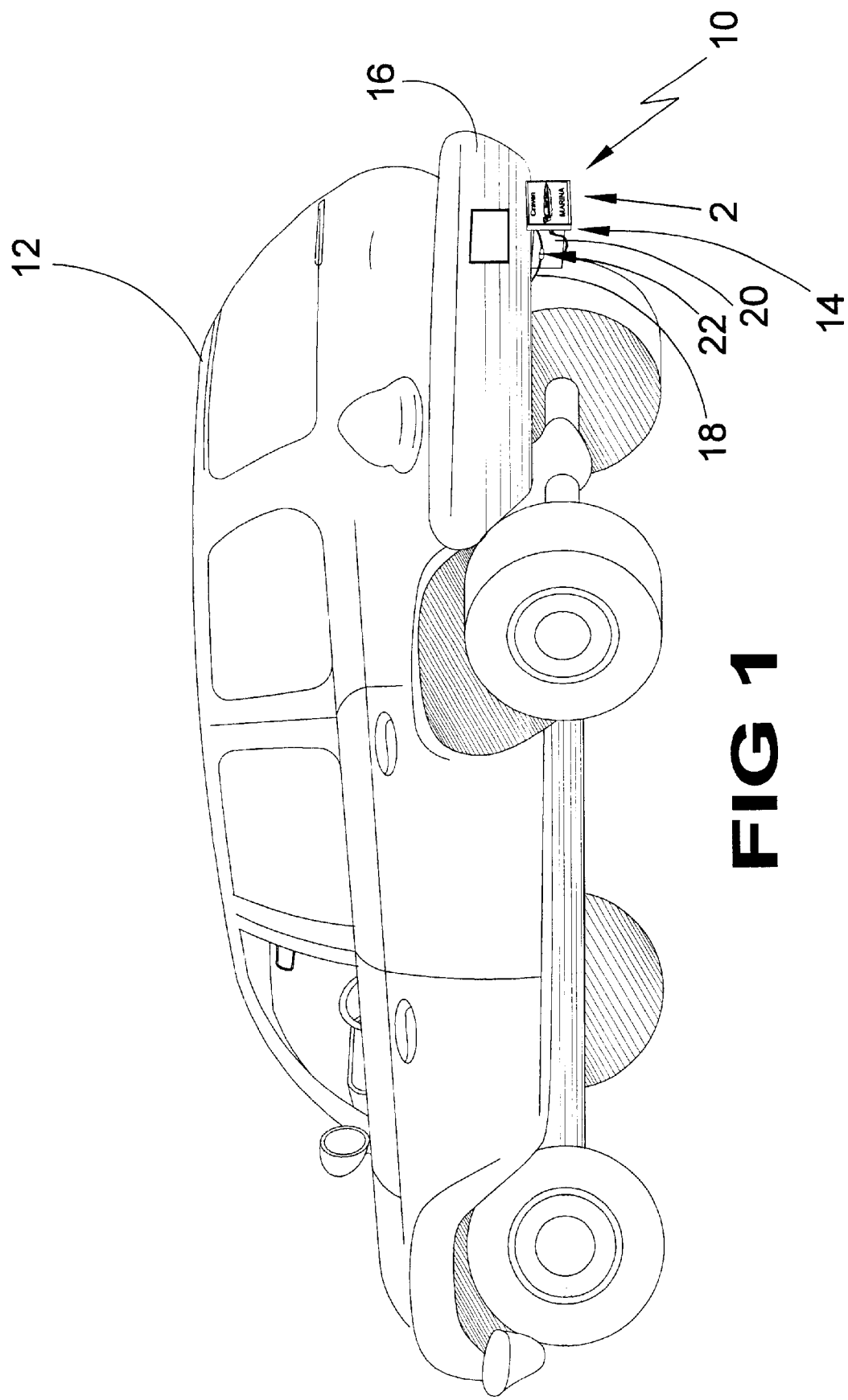
FIG. 1 is a perspective view of the present invention in operative connection with a vehicle.

Turning to FIG. 1, therein is shown a perspective view of the present invention 10 shown in operative connection with a vehicle 12. The present invention 10 is mounted onto a standard frame mounted trailer hitch socket shown generally at 14 which 14 is mounted underneath the rear bumper 16 in the standard manner. The electrical wiring 18 is an existing trailer wiring harness which is used by the present invention 10 for power. Also shown is the new wiring 20 for the present invention. A means for electrical connection 22 for connecting wiring 18 and 20 is also shown.

Figure 2:
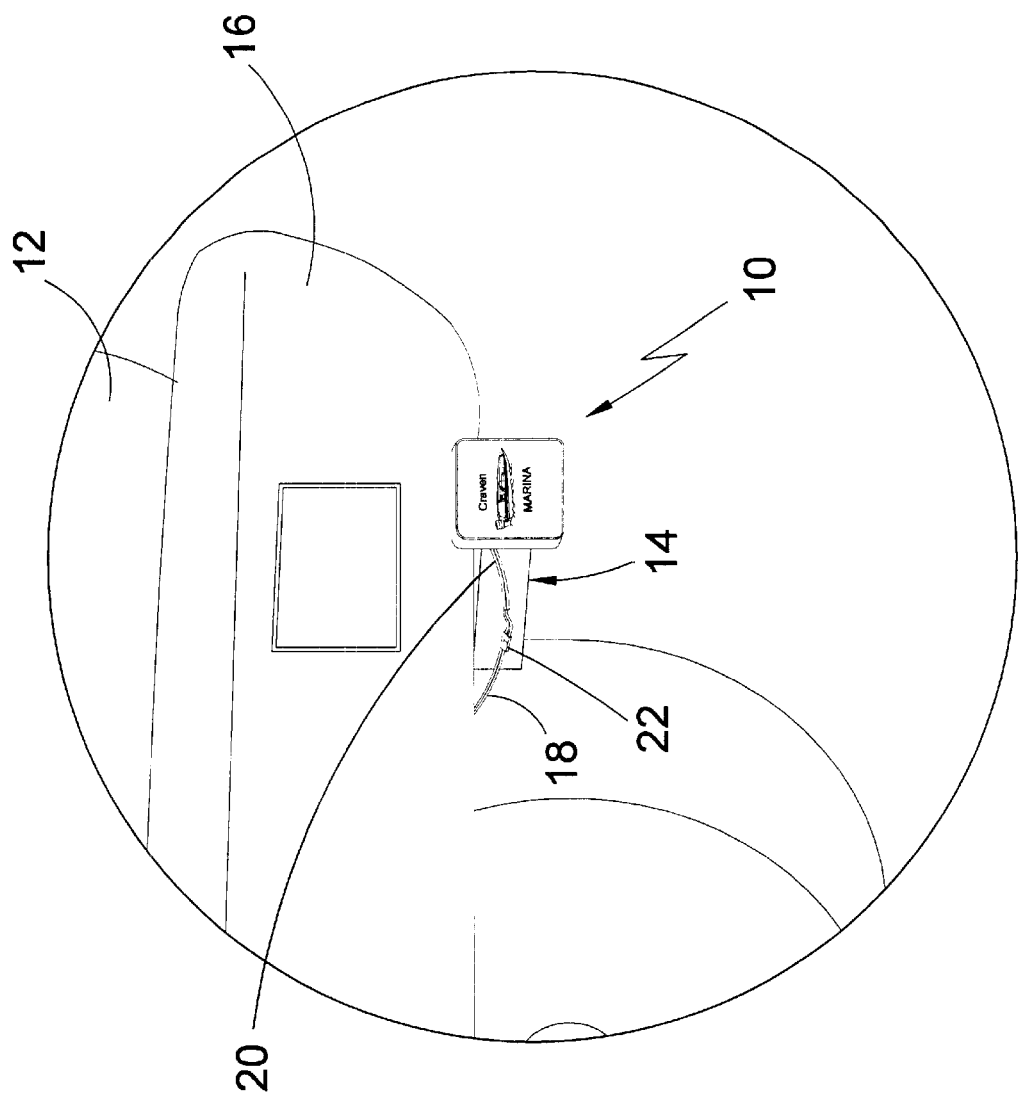
FIG. 2 is an enlarged view of the present invention in operative connection with a vehicle as indicated on FIG. 1.

Turning to FIG. 2, therein is shown a perspective view of the present invention 10 mounted onto the bumper 16 of a vehicle 12. The trailer hitch 14 is shown along with the existing wiring 18 of the vehicle and the new wiring 20 of the present invention having connection means 22 between the existing wiring 18 and the new wiring 20 of the present invention.

Figure 3:
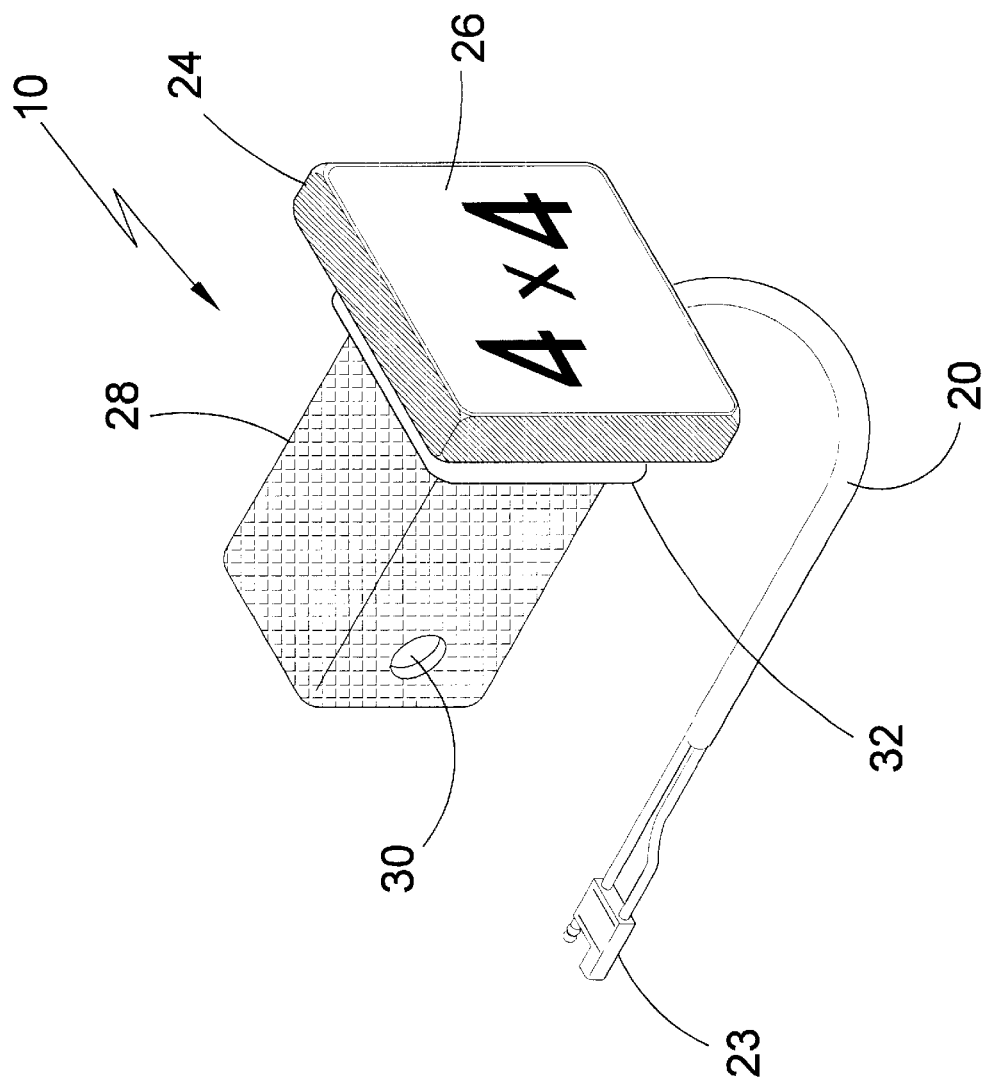
FIG. 3 is a perspective view of the present invention.

Turning to FIG. 3, therein is shown a perspective view of the present invention 10 having a square or similar shaped housing 24 having a lens for display 26 mounted thereon. The present invention 10 has a mounting tube 28 which is inserted into a standard two-inch or like square or rectangular trailer hitch receiver tubes or socket 14 (not shown). Also shown on the mounting tube 28 is an aperture 30 for receiving a mounting pin (not shown) for securing tube 28 inside the trailer hitch socket. Also shown are an outer gasket 32 which is mounted between the housing 24 and the standard trailer hitch receiving tube or socket (not shown) along with the wiring harness 20 for the present invention having a new connection means 23 for the present invention of the standard type.

Figure 4:
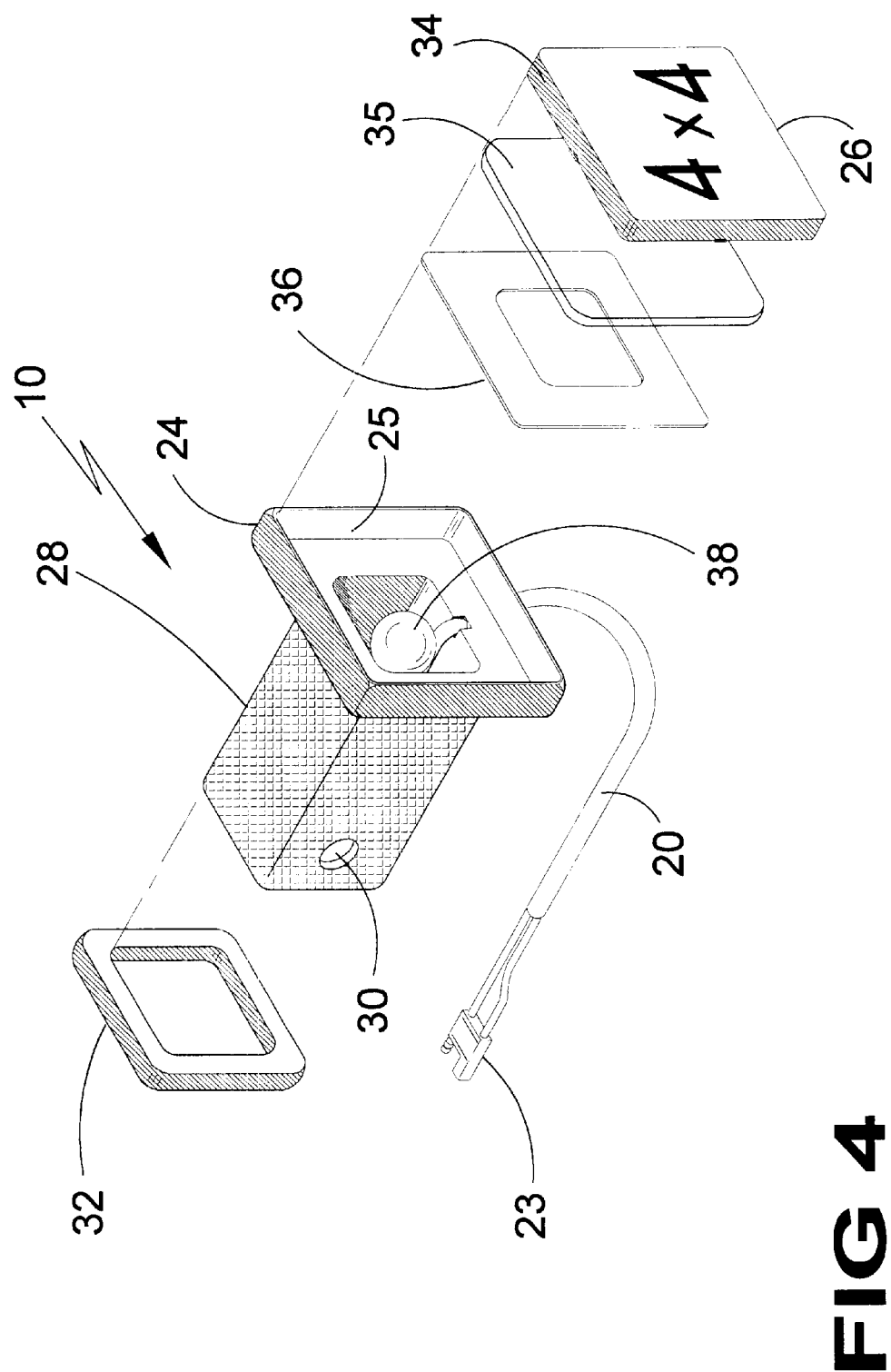
FIG. 4 is an exploded view of the present invention.

Turning to FIG. 4, therein is shown an exploded view of the housing 24 along with the elongated mounting tube 28 and outer gasket 32 which surrounds tube 28. Also shown is the wiring harness 20 and connection means 23 along with aperture 30. Also shown is the lens display 26 which is displayed on the lens 34 which is mounted inside the enlarged recess 25. An inner gasket 36 is shown for mounting between the lens 34 and housing 24. Also shown is an opaque light diffuser made of thin plastic or wax covered paper which fits between lens 34 and inner gasket 36 being complementrally sized as lens 34 and being thereby disposed in order to diffuse the light shining from bulb 38 onto lens display 26. A single filament 1156 light bulb 38 is shown mounted internal of the housing 24.

Figure 5:
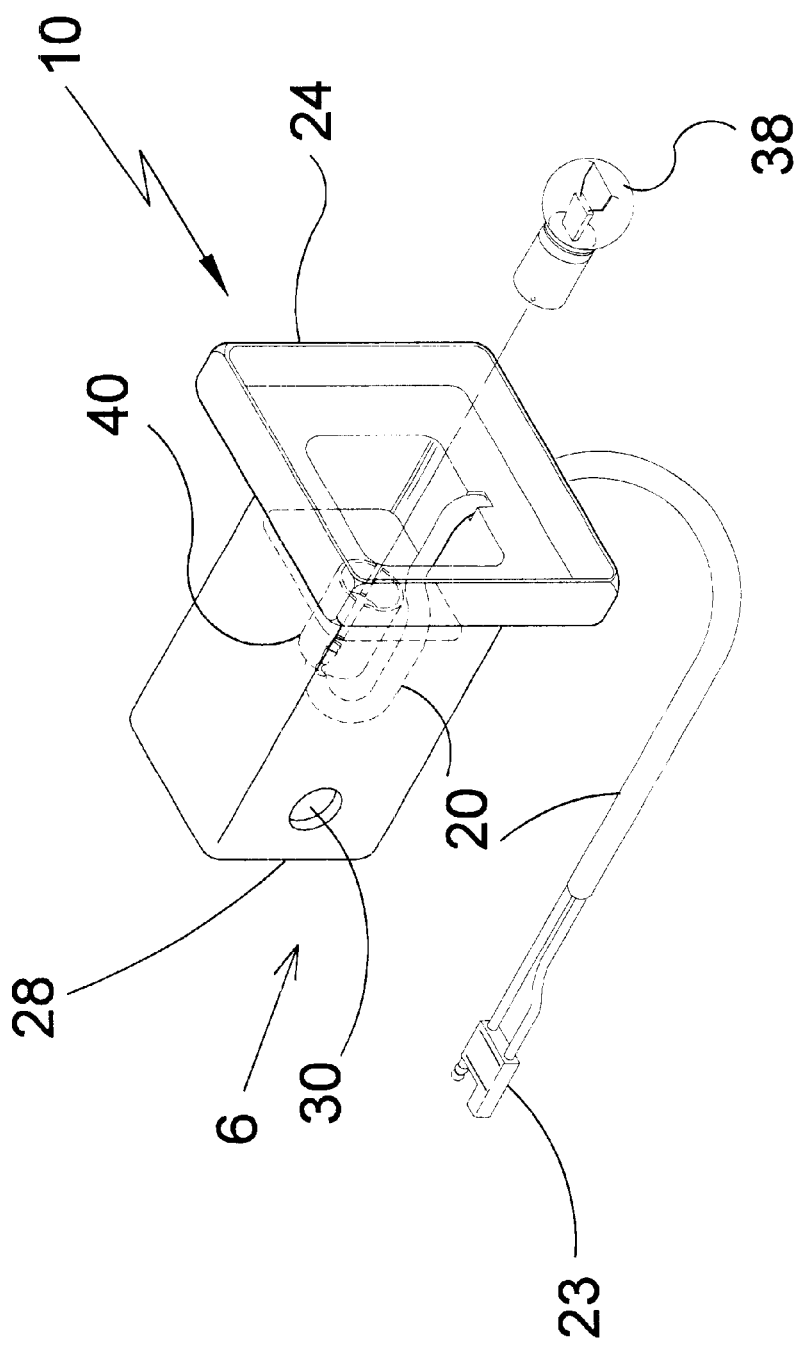
FIG. 5 is an exploded view of the present invention showing a light bulb and socket.

Turning to FIG. 5. therein is shown a perspective view of the present invention 10. Shown therein are the housing 24, mounting tube 28, aperture 30, and internal bulb socket 40 for receiving the light bulb 38. The new wiring 20 is also shown for the present invention along with new connection means 23.

Figure 6:
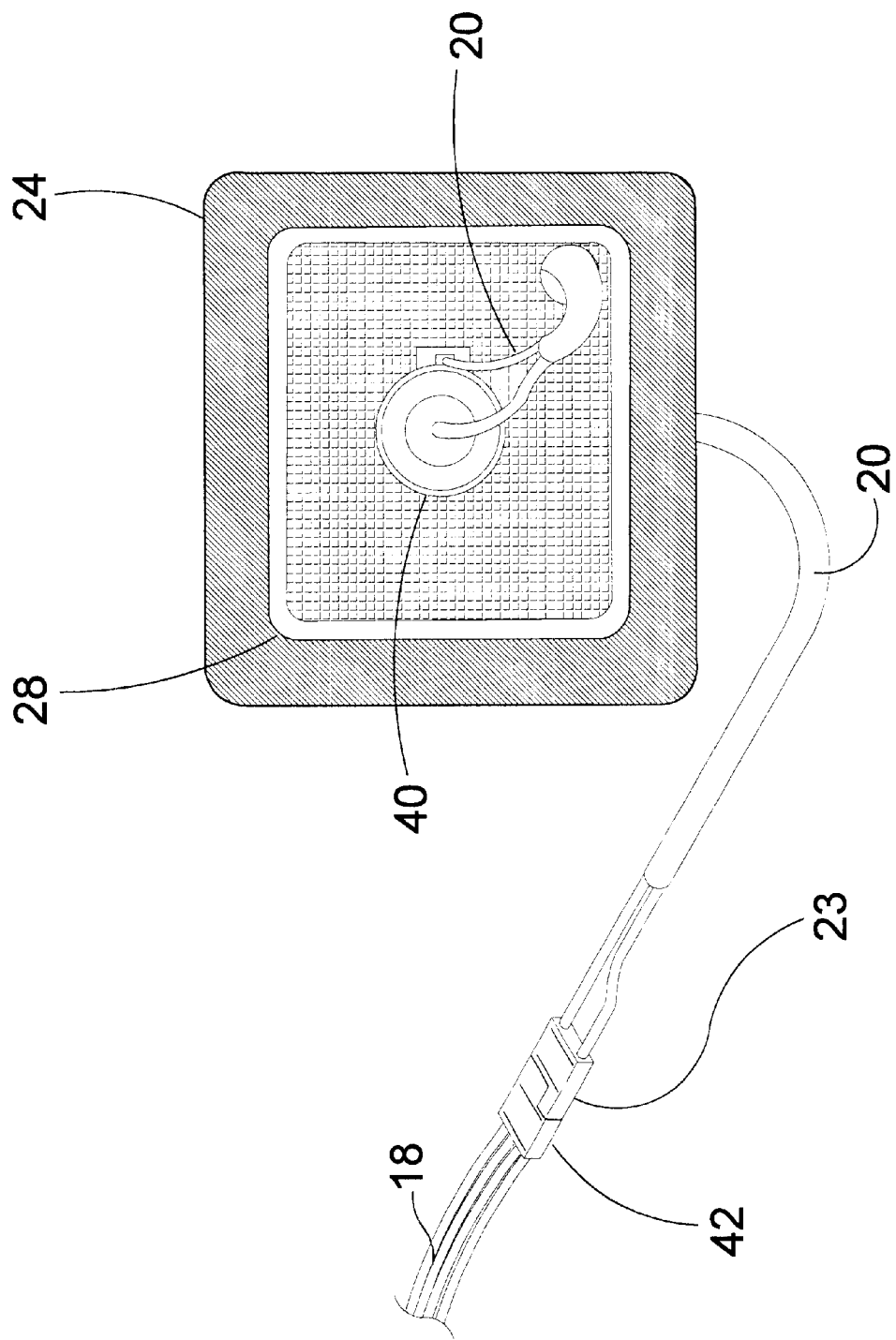
FIG. 6 is a perspective view of the present invention taken from the rear as indicated on FIG. 5.

Turning to FIG. 6, therein is shown a rear perspective view of the present invention. Shown is the housing 24 along with the mounting tube 28 and the internal bulb socket 40 along with the wiring 20 of the present invention. Also shown is new connection means 23 of the present invention making connection with the mating existing connector 42 and existing wiring 18 of the vehicle.

Figure 7:
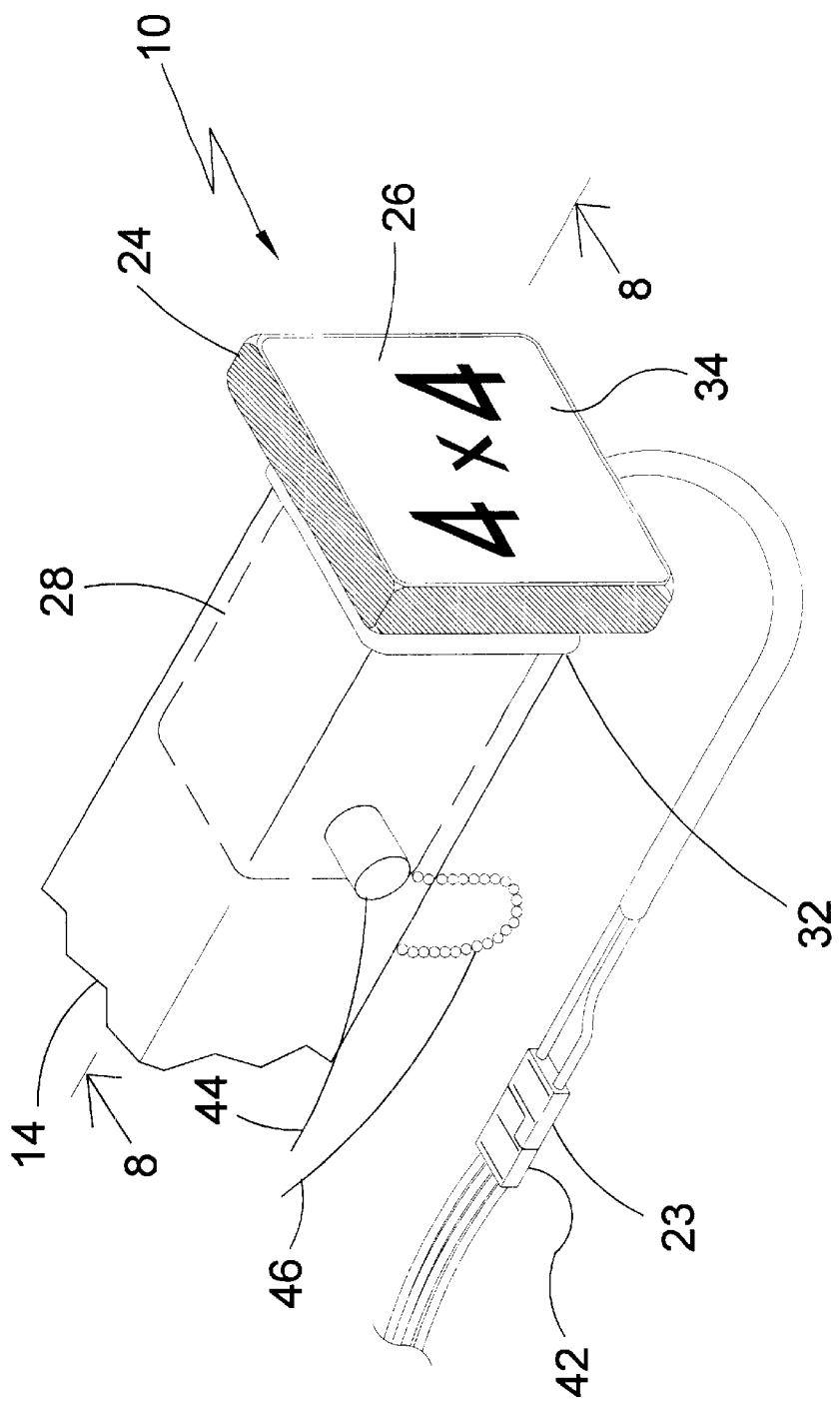
FIG. 7 is a perspective view of the present invention shown in operative connection with a trailer hitch.

Turning to FIG. 7, therein is shown a perspective view of the present invention 10 mounted internal of a standard two-inch or like square trailer hitch 14. Shown is the housing 24. mounting tube 28, along with the lens display 26. Also shown are a pin 44 and a chain 46 which is inserted through the aperture 30 (not shown) for holding the present invention 10 onto the trailer hitch 14. Also shown is outer gasket 32, existing connection means 23, and the existing mating connection means 42.

The present invention discloses a 12-volt, illuminated receiver style hitch cover 10 with a decorative lens display 26 on the lens face 34 which lights when the vehicle's brake pedal is pushed. The receiver cover fits into 2※ or like standard receiver hitches 14 and plugs electrically into the existing trailer wiring 18 for power. The illuminated logo hitch cover is a 2※ or like square tube 28 to be inserted into a vehicle's hitch receiver tube or socket 14 tube attached to a 3.25※ or like square face which houses the lens cover 34. Mounted at the opening between the tube and the face is a socket 40 (not shown) which holds a 1156 single filament automotive light bulb 38 (not shown) which provides the illumination to the lens. Power for the bulb is provided by a two-wire plug attached to the back of the socket to be coupled with the vehicle's trailer wiring harness 18 plug. The lens 34 is a two-color plastic lens with a decorative design 26 on the face of it. The lens itself is an opaque red reflective lens which will allow light to pass through it. The design is made by applying a vinyl decal to the face of the lens which has the pattern for the lens cut into it. The lens is then sprayed with several even coats of black vinyl dye, allowing each coat to thoroughly dry. The dye will cover the unexposed parts of the lens and the vinyl decal. After the lens cover is completely and evenly painted the vinyl decal is removed allowing the red opaque parts of the lens that were covered by the decal to show, thus creating the two-color design of reflective red and black. When the lens is inserted into the face of the hitch cover and the bulb is illuminated the light will show through the red portions of the design but not the black. The face can be decorated with different vinyl decals to create a wide variety of designs for the faces of the hitch covers.

Figure 8:
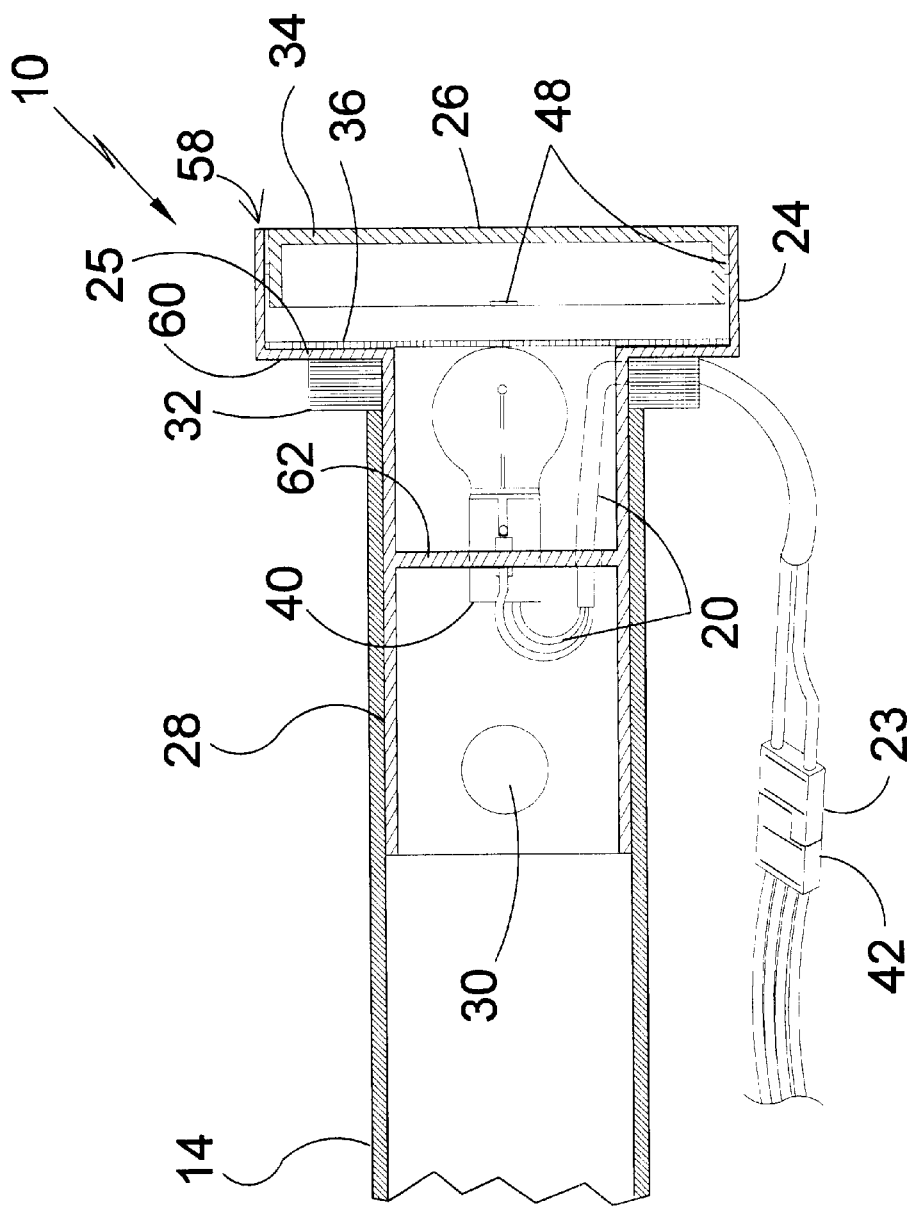
FIG. 8 is a cross-sectional view of the present invention taken as indicated in FIG. 7.

Turning to FIG. 8, therein is shown a cross-sectional view of the present invention 10 in operative connection with the trailer hitch 14. Shown is the lens display 26, outer gasket 32 between the rear end 60 of the enlarged recessed area 25 and the trailer hitch socket 14, along with the light bulb socket 40, mounting tube 28, and aperture 30. Also shown are multiple snap means being ear-like protrusions 48 which are used for insertion into multiple mating receiving internal apertures in housing 24 to secure the light transparent lens 34 inside the housing 24 which has a front end 58 and a rear end 60. Also shown are the internal wiring 20 of the present invention along with connection means 23 and 42. A partition wall 62 is shown internal and transverse to mounting tube 28 being approximately intermediate to tube 28. Inner gasket 36 is shown between the enlarged recess 25 and lens 34.

Figure 9:
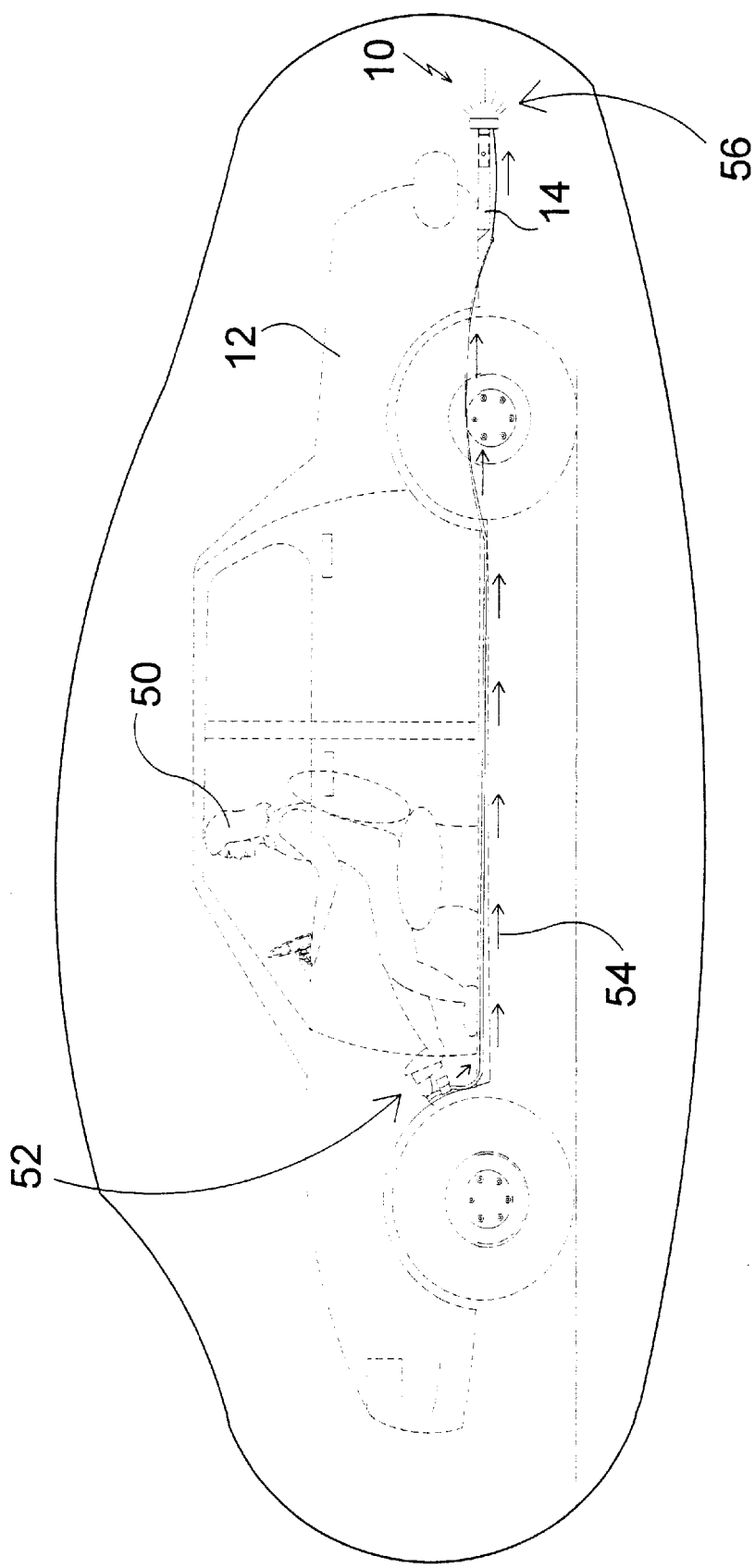
FIG. 9 is a perspective view of the present invention shown in operative connection with a vehicle.

Turning to FIG. 9, therein is shown a perspective view of the present invention 10 mounted onto a vehicle 12. Shown is an operator 50 pushing the brake pedal 52 which completes the electrical circuit and transmits electricity represented by direction arrow 54 to the present invention 10 whereby the light beam 56 is illuminated. Trailer hitch 14 is also shown.

I claim:

1. An apparatus for an ornamental design for mounting into a trailer hitch receiving socket and for connection to the existing electrical wiring harness of the vehicle, comprising:

a) a housing being substantially square shaped defined by a front end and a rear end, said housing having an enlarged recess on its front end for receiving the design, said enlarged recess having a front side and a rear side;

b) an elongated mounting tube disposed centrally on said rear side of said housing, said mounting tube complementrally shaped as the trailer hitch socket for insertion into the trailer hitch socket;

c) a partition wall disposed internal and transverse to said elongated mounting tube, said partition approximately intermediate said elongated mounting tube;

d) a means for a light comprising a socket and a light bulb disposed centrally in said partition wall whereby light beams emanate from said front of said housing, said light thereby being located within said trailer hitch socket;

e) said ornamental design comprising a light transparent lens disposed internal said enlarged recess of said front end of said housing;

f) means for attaching said light transparent lens in said enlarged recess whereby said lens is removably secured;

g) means for electrically connecting said means for a light to a brake light system of the vehicle so that said light is activated during braking of the vehicle;

h) an outer gasket disposed on the rear side of said enlarged recess, said outer gasket further disposed around said elongated tube for communication with said trailer hitch socket;

i) an inner gasket disposed internal said enlarged recess between said enlarged recess and said light transparent lens and a light diffuser disposed between said inner gasket and said light transparent lens;

j) said light transparent lens comprising a flat surface with side walls extending therefrom for sliding into said recess, said means for attaching said light transparent lens in said recess comprising protrusions on outer surfaces of said side walls, said recess having multiple recesses for receiving said protrusions so that said lens is removably secured within said recess; and k) said light transparent lens having a logo thereon so that when said light is on a lighted logo directly to the rear of and in line with said trailer hitch socket is visible from the rear of the vehicle.

2. The apparatus of claim 1, said means for electrically connecting said means for a light to the existing electrical wiring harness of the vehicle further comprising a new wiring harness, said new wiring harness having a new electrical connector means thereon whereby said new wiring harness is connected to said existing wiring harness of the vehicle.

3. The apparatus of claim 1, wherein a plastic is used to make the apparatus.

4. The apparatus of claim 1, said elongated mounting tube having an aperture therein.

5. The apparatus of claim 4, said aperture disposed in the side of said mounting tube for receiving a mounting pin.

6. An illuminated logo hitch cover in combination with a trailer hitch mounted on the rear of a vehicle, said hitch having a rearwardly facing open socket, comprising:

a) said hitch cover comprising a housing being substantially square shaped defined by a front end and a rear end, said housing having an enlarged recess on its front end for receiving a light transparent lens, said enlarged recess having a front side and a rear side;

b) an elongated mounting tube disposed centrally on said rear side of said housing, said mounting tube sized and shaped to slide into the trailer hitch socket;

c) a partition wall disposed internal and transverse to said elongated mounting tube, said partition approximately intermediate said elongated mounting tube;

d) a light socket and a light bulb disposed centrally in said partition wall whereby light beams emanate from said front of said housing through said light transparent lens, said socket and light bulb being located within said trailer hitch socket;

e) said light transparent lens disposed internal said enlarged recess of said front end of said housing;

f) means for attaching said light transparent lens in said enlarged recess whereby said lens is removably secured;

g) means for electrically connecting said light bulb to a brake light system of the vehicle so that said light is activated during braking of the vehicle;

h) an outer gasket disposed on the rear side of said enlarged recess, said outer gasket further disposed around said elongated tube for communication with said trailer hitch socket;

i) an inner gasket disposed internal said enlarged recess between said enlarged recess and said light transparent lens and a light diffuser disposed between said inner gasket and said light transparent lens;

j) said light transparent lens comprising a flat wall with an outer surface with side walls extending therefrom for sliding into said recess, said means for attaching said light transparent lens in said recess comprising protrusions on outer surfaces of said side walls, said recess having multiple recesses for receiving said protrusions so that said lens is removably secured within said recess; and k) means for placing a logo on said outer surface of said flat wall of said light transparent lens so that when said light glows a lighted logo directly to the rear of and in line with said trailer hitch socket is visible from the rear of the vehicle.

* * * * *